United States Patent [19]

Caesar et al.

[11] Patent Number: 5,280,584
[45] Date of Patent: Jan. 18, 1994

[54] TWO-WAY DATA TRANSFER APPARATUS

[75] Inventors: Knut Caesar, Gundelfingen; Ulrich Schmidt, Freiburg; Thomas Himmel, Kenzingen; Arnold Uhlenhoff, Emmendingen, all of Fed. Rep. of Germany

[73] Assignee: Deutsche ITT Industries GmbH, Freiburg, Fed. Rep. of Germany

[21] Appl. No.: 614,777

[22] Filed: Nov. 5, 1990

[30] Foreign Application Priority Data

Nov. 21, 1989 [EP] European Pat. Off. ........ 89121507.1

[51] Int. Cl.⁵ .............................................. G06F 1/00
[52] U.S. Cl. .................................................. 395/250
[58] Field of Search ...................... 395/250, 275, 550; 365/239, 78, 221; 364/239.6, 239

[56] References Cited

U.S. PATENT DOCUMENTS

| | | | |
|---|---|---|---|
| 4,357,658 | 11/1982 | van der Ouderaa | 364/200 |
| 4,378,588 | 3/1983 | Katzman et al. | 395/275 |
| 4,592,019 | 5/1986 | Huang et al. | 365/78 |
| 4,816,993 | 3/1989 | Takahashi et al. | 395/250 |
| 4,823,312 | 4/1989 | Michael et al. | 395/250 |
| 4,866,609 | 9/1989 | Calta et al. | 395/250 |
| 4,888,739 | 12/1989 | Frederick et al. | 365/221 |
| 4,933,840 | 6/1990 | Sera et al. | 395/425 |
| 4,935,894 | 6/1990 | Ternes et al. | 395/325 |
| 4,942,553 | 7/1990 | Dalrymple et al. | 395/250 |
| 4,945,548 | 7/1990 | Iannarone et al. | 375/4 |
| 5,155,810 | 10/1992 | McNamara et al. | 395/250 |

FOREIGN PATENT DOCUMENTS 3235243 3/1984 Fed. Rep. of Germany .

OTHER PUBLICATIONS

Electronic Design; vol. 37, No. 21, Oct., 1989, Hasbrouck Heights, N; pp. 93-94; D/ Bursky: "Settable flags add, flexibility to FIFO ICs".
Proceeding Autotescon, Oct. 22-24, 1985; Uniondale, New York, U.S.A., pp. 309-314; G. Anderson: "Modular System Interface Bus Providing New Opportunities for Modular Measurement Systems".
Microprocessors and Microsystems; vol. 12, No. 3, Apr., 1988, London, GB; pp. 130-134; G. Inett: "Multiprocessing and the STEbus".
IEE Transaction on Computers, vol. C-36, No. 12, Dec., 1987; pp. 1523-1538; M. Annaratone, et al: "The Warp Computer: Architecture, Implementation, and Performance".

Primary Examiner—Dale M. Shaw
Assistant Examiner—D. Dinh
Attorney, Agent, or Firm—Thomas L. Peterson

[57] ABSTRACT

A two-way data transfer device for the data interface between two data-exchanging cells including a data source and a data sink with at least one buffer provided in each cell. When the transmitter buffer is full or the receiver buffer is empty, a backward cell stop signal freezes the state of the data source or the data sink and the cell stop signals are controlled by status signals from the respective buffers.

18 Claims, 3 Drawing Sheets

TWO-WAY DATA TRANSFER APPARATUS

BACKGROUND OF THE INVENTION

In data processing equipment, if unidirectional or bidirectional data transfer is not performed in synchronism with a common system clock and/or is not continuous, the system requires two-way data transfer devices or handshake ports. An essential function of such ports is the handshaking protocol, which ensures that data is transmitted only if data is actually available at the transmitter and if the receiver is actually ready to receive. In more complex systems, these preconditions are not always fulfilled. For example, the system clock may have considerable phase deviations due to differential delays, so that correct data transfer is not ensured. The higher the frequencies of the system clock, the more critical the differential delays will be.

Another difficulty in more complex systems is that it may not be possible to estimate when a data word is actually available. This depends, for example, on internal delays and run times of the data-processing circuits. Such problems are further complicated when parallel processing is performed using pipelining.

In an article entitled "The Warp Computer: Architecture, Implementation, and Performance", published in "IEEE Transactions on Computers", Vol. C-36, No. 12, December 1987, pages 1523 to 1538, a large computer is described whose processor modules exchange data by means of a handshaking protocol. Communication between the individual processor modules takes place via queues. When a queue (first-in-first-out memory FIFO memory) is full or empty, the transmitting or receiving module, respectively, is blocked by a stop signal until the data traffic can be handled via the queue again. This occurs when the queue has additional space or slots for additional data when new data is available. Such a data-driven data transfer device is very advantageous if a plurality of such interfaces are involved in the data processing. For the programmer, the whole data processing thus becomes "transparent".

SUMMARY OF THE INVENTION

There is provided a two-way data transfer device for a data interface between a data source (transmitter) and a data sink (receiver). The data sink operates asynchronously with the data source which requires only a single clock period for a data transfer. The data transfer is extendable to an arbitrary number of clock periods, particularly two, by a program modification. The modification includes means for buffering the transmitted data in the presence of nonuniform data-generation and data-acceptance rates. The operation of the data source being interrupted when the buffer is full, and the operation of the data sink being interrupted when the buffer is empty.

DETAILED DESCRIPTION OF THE INVENTION

Figure 1:
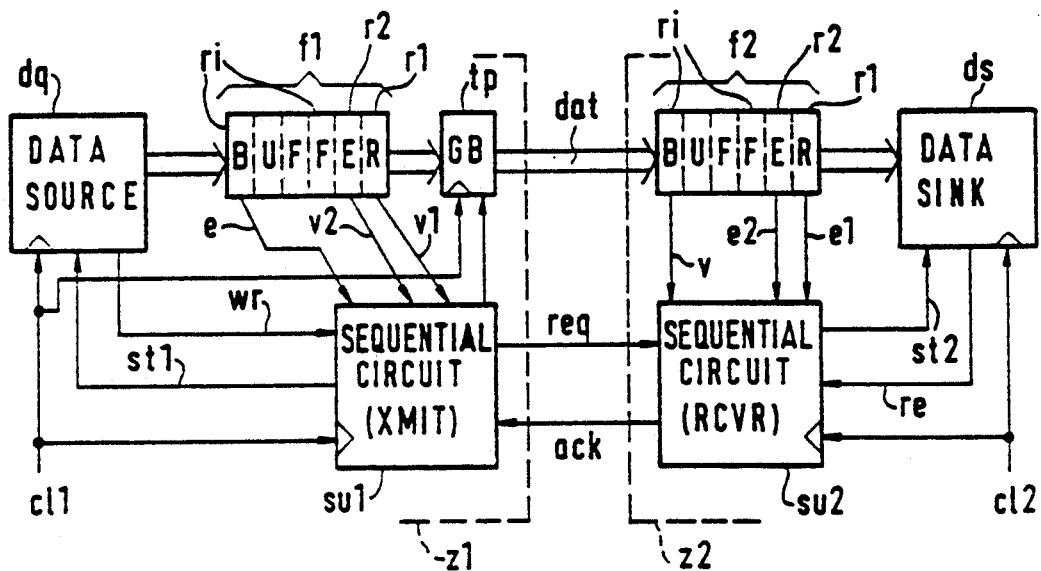
FIG. 1 is a block diagram of an embodiment of a two-way data transfer device operating with a handshake protocol in accordance with the invention.

The two-way data transfer device (handshake port) shown in FIG. 1 contains two data-exchanging cells. The first cell z1 serves as a data transmitter, and the second cell z2 as a data receiver. The actual signal-processing circuits of the first and second cells z1, z2 are schematically combined as a data source dq and a data sink ds, respectively. The data delivered by the data source dq is buffered in a transmitter buffer f1, which has at least a first buffer register r1 and a second buffer register r2 and, if necessary, a predetermined number of additional buffer registers ri. The transmitter buffer preferably comprises a FIFO memory (first-in-first-out memory). The FIFO memory is followed by a gate/buffer circuit, tp, which also serves as a driver circuit for the data to be transmitted, i.e., the data dat.

The device corresponding to the transmitter buffer f1 on the receiver side is the receiver buffer f2, which is also implemented as a FIFO memory. The receiver buffer includes a first buffer register r1 and a second buffer register r2 and, if necessary, a predetermined number of additional buffer registers ri. Just a single buffer f1 on the transmitter side or a single buffer f2 on the receiver side makes it possible for the data sink ds or the data source dq to have different data-acceptance or data generation rates, respectively. Compensation is effected via the buffers. The longer the compensation period, the greater the number of available buffer registers ri on the transmitter or receiver side must be. As will be shown, the transmitter side requires at least two buffer registers. This is because the particular execution phases of the handshaking protocol cannot deactivate the data source dq fast enough. Because of this, the generated data must be buffered.

Data transfers are controlled by the transmitter and receiver sequential circuits su1, su2, which implement the data transfers by means of the handshaking protocol. If the data source dq sends a write signal wr to the transmitter sequential circuit su1 to indicate that it wants to write a data word into the transmitting port, the transmitter sequential circuit su1 will check whether the transmitter buffer f1 is ready to receive, i.e., whether it contains any empty buffer registers or whether all buffer registers are full. For this information, the transmitter buffer f1 provides three status signals:

1. a first status full signal v1 when all buffer registers are full;
2. a second status full signal v2 when all buffer registers are full but one, and
3. a status empty signal e when all buffers registers are empty.

With these status signals, the following occupancy levels of the transmitter buffer f1 can be represented:

| Status Signals | Contents of transmitter buffer f1 | | | |
| --- | --- | --- | --- | --- |
| | All registers full | All registers full but one | At least two empty registers | All registers empty |
| v1 | 1 | (0) | 0 | (0) |
| v2 | (1) | 1 | 0 | (0) |
| e | (0) | (0) | 0 | 1 |

Analogously, the receiver buffer f2 provides the following three signals:
1. a first status empty signal e1 when all buffer registers are empty;
2. a second status empty signal e2 when all buffer registers are empty but one, and
3. a status full signal v when all buffer registers are full.

| | Contents of transmitter buffer f2 | | | |
|---|---|---|---|---|
| Status Signals | All registers empty | All Registers empty but one | At least two full registers | All registers full |
| e1 | 1 | (0) | 0 | (0) |
| e2 | (1) | 1 | 0 | (0) |
| v | (0) | (0) | 0 | 1 |

A read signal re from the data sink ds indicates to the receiver sequential circuit su2 that a data word dat is to be read from the port. The availability or nonavailability of data words in the receiver buffer f2 is signalled to the receiver sequential circuit su2 by the three status signals e1, e2, v as just described.

Figure 2:
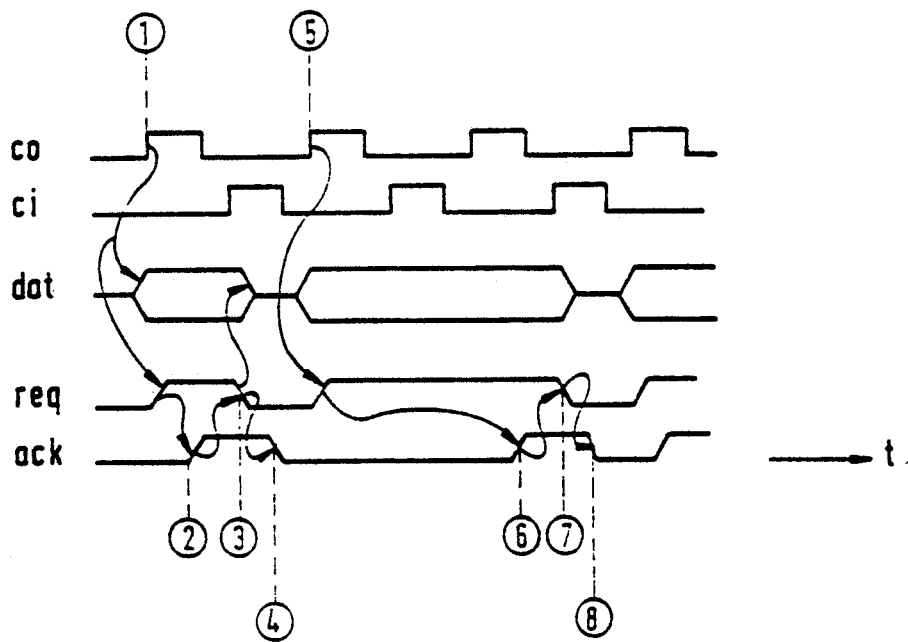
FIG. 2 is a timing diagram for the handshake protocol.

The timing diagram for the handshaking protocol of the two sequential circuits su1, su2 is illustrated in FIG. 2. The handshaking protocol begins at the instant 1 with the request signal req, which indicates to the receiver sequential circuit su2 that a data word dat is to be transferred. The acceptance of this data word is indicated to the transmitter sequential circuit su1 at time 2 by setting an acknowledge signal ack. In the transmitter sequential circuit su1, the reception of the acknowledge signal ack causes the request signal req to be reset at time 3. In the receiver sequential circuit, this resetting causes the acknowledge signal ack to be cancelled at time 4. In FIG. 2, it is assumed that at time 5 the data to be transferred, dat, can only be accepted by the receiver one clock period later and not immediately. The acknowledge signal is thus set one clock period later, at time 6. The remainder of the handshaking protocol is then executed without delay at times 7 and 8. Only then can a new data transfer cycle begin.

The above sequence of operations ensures a correct data transfer independently of the execution time of the handshaking protocol. Thus by a suitable design of the individual subcircuits, the handshaking protocol can be implemented within one clock period even at very high clock rates. However, cell control problems arise if control sequences require more than one clock period because they include, for example, an initialization phase and an execution phase. These include the backward and forward cell stop signals st1, st2, which are dependent on status signals, since the setting of the status signals takes place in a different clock period than their evaluation. There is a problem if the data source dq is deactivated because the acknowledge signal ack is not reset by the receiver sequential circuit su2. If there is a circuit-induced latency between the resetting of the acknowledge signal and the deactivation of the data source dq, then the data source dq will continue to run for another one or two clock periods. In that case, the data still generated by the data source dq must be buffered in a buffer register on the transmitter side and released only when the acknowledge signal ack is reset. In any event, status signals which indicate the occupancy level of these buffer registers are not necessary to deactivate the data source dq if the activation of the data source requires the same number of clock periods.

Such is also the case if two read statements re directly succeed one another while only one data word is available in the receiver buffer f2. Here, the second read statement would encounter an unset status empty signal and the system would assume that the receiver buffer f2 contains a data word—that is no longer the case, however.

Similar operations take place in the transmitter sequential circuit su1, which, if two write statements wr directly succeed one another, will recognize that the transmitter buffer f1 is full if only one register was available in the transmitter buffer f1 at the first write statement. If this access data is lost, the deactivation of the data source dq by means of the backward cell stop signal st1 from the transmitter sequential circuit su1 would thus come one clock period too late, so that one data word of the data source dq would be lost because of the memory being full.

The deactivation of the data sink ds by means of the forward cell stop signal st2 from the receiver sequential circuit su2 would also come one clock period too late, so that the data sink ds would read from the empty buffer f2.

To remedy this, according to the invention, the transmitter and receiver buffers f1, f2 are each monitored by an additional status signal, namely the second status full signal v2 and the second status empty signal e2, respectively. The initialization of the exceptionally long control sequence occurs earlier in time.

Figure 3:
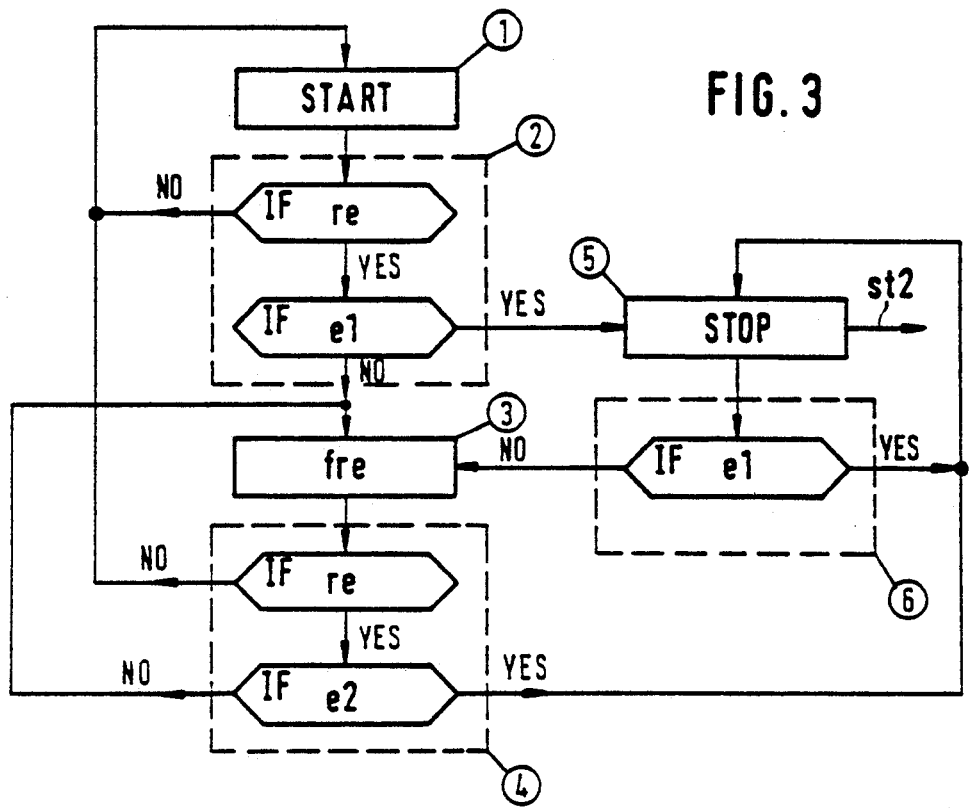
FIG. 3 is a flowchart showing the execution cycle of a read statement.

To illustrate this, FIG. 3 shows a flowchart of the execution cycle of a read statement re. The rectangular boxes symbolize that a statement is executed, which takes place during the co phase of the clock c12. The hexagonal boxes symbolize the statements to be read during the ci phase, together with the associated conditions. Execution takes place during the next co phase. These conditions are illustrated in the flowchart as yes/no decisions. The setting of these condition signals takes place during the ci phase of the clock c12.

The flowchart begins at time 1 in the co phase with the execution of an arbitrary statement, called "start" here. At time 2, i.e., during the ci phase, the next program statement and, as a condition, the first status empty signal e1 are loaded. If this statement is not a read statement re, one of the usual statements will be executed, which is illustrated by an arrow to the input of the start statement. If the statement is a read statement re, the sequence of operations will depend on the state of the first status empty signal e1. If this signal is "0", i.e., not set, the read statement re will be executed during the next co phase; this is illustrated in the flowchart by the read block fre and takes place at time 3.

If the receiver buffer f2 was empty, which is indicated by the first status empty signal e1 being set to "1", the signal processing in the data sink ds will be stopped, which is illustrated in the flowchart by the block "stop" with the forward cell stop signal st2. When this state has been initiated, the state of the data processing in the data sink ds during the co phase remains "frozen". This freeze is maintained until the first status empty signal e1 from the receiver buffer f2 is reset, i.e., assumes the state "0". Depending on the state of the first status empty signal e1, either a new wait loop or the execution of the read statement is initiated during the ci phase. If the first status empty signal e1 is not set, the arrow will therefore point to the read block fre, as at the instant 3.

The execution fre of this read statement reinitiates the following preparations for the next statement. The second status empty signal e2 is transferred from the receiver buffer f2 to the receiver sequential circuit su2, in which the following condition function is implemented:
1. If the next statement is no read statement re, this statement is to be executed, which is illustrated in the flowchart by a return to the start block.
2. If the next statement is a read statement re, it will be executed only if the second status empty signal e2 is not set, i.e., if it is "0". Otherwise, i.e., with the second status empty signal e2 set, a forward cell stop st2 will be executed instead of the next read statement; this is indicated by an arrow to the input of the stop block. Instead of the intended execution of the second read statement re at time 5 during the co phase, the existing data state is frozen.

In the subsequent ci phase, i.e., at the instant 6, the further program execution is determined only by the state of the first status empty signal e1. If the status empty signal e1 is set, another wait loop will be executed; if the signal is not set, the read statement re will be executed.

Since a second read statement may be directly followed by further read statements, the unset second status empty signal e2 causes a return to the read block fre rather than the start block. As long as read statements succeed one another and the receiver buffer f2 contains at least two data words, this loop will not be left.

Figure 4:
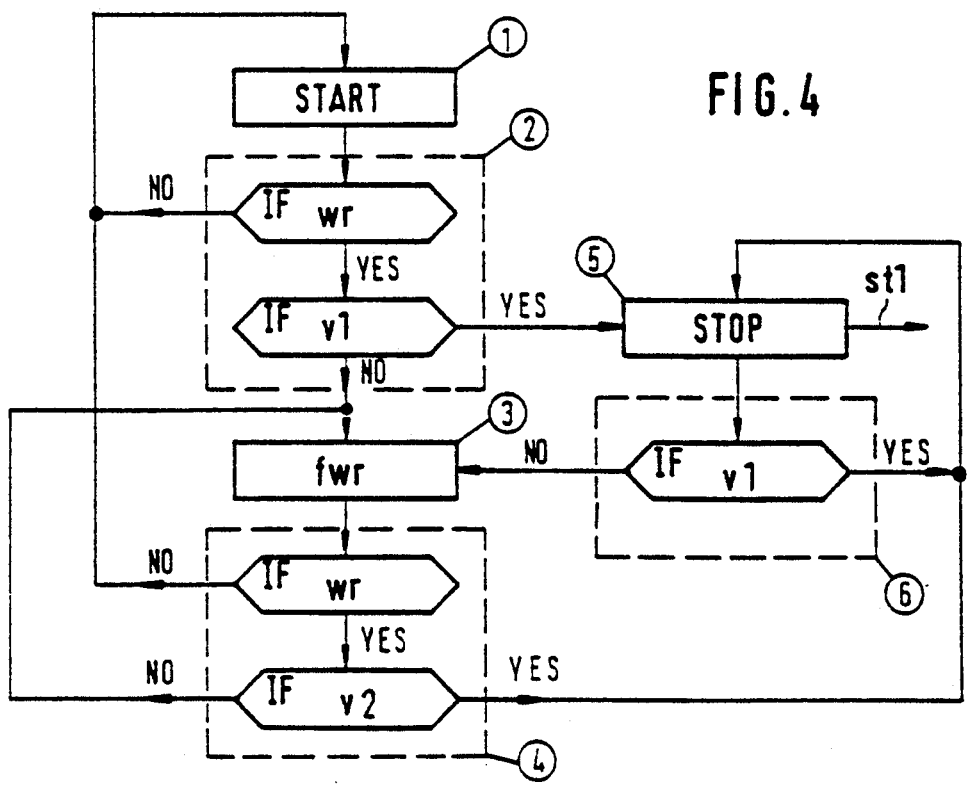
FIG. 4 is a flowchart showing the execution cycle of a write statement.

The monitoring of successive write instructions on the transmitter side corresponds to the monitoring of successive read instructions on the receiver side. The flowchart for the execution cycle of a write statement is shown in FIG. 4. As it corresponds to the flowchart of FIG. 3, it need not be described again in detail. The following correspond to each other: the read statement re and the write statement wr, the first status empty signal e1 and the first status full signal v1, the second status empty signal e2 and the second status full signal v2, the execution fre of the read statement re and the execution fwr of the write statement wr, and the forward cell stop signal st2 and the backward cell stop signal st1.

The basic characteristic of the flowchart of FIG. 4 consists in the fact that, if write statements wr directly succeed one another, at least one wait loop will be inserted if the second status full signal v2 indicates that during the execution fwr of the first write statement wr, only one register in the transmitter buffer f1 can receive data. If further empty locations are available in the transmitter buffer f1, successive write statements wr will cause a return to the write block fwr, which will execute the write statement wr during the co phase.

In FIG. 2, the normal case, in which a data transfer is performed during a single clock period, is shown between the instant 1 and the instant 4. The next data transfer, from the instant 5 to the instant 8, takes longer, because the acceptance of data occurs later, at the instant 6; the receiver buffer f2 was full. The prolongation of this data transfer was not intended.

In the case of data interfaces which serve to exchange data beyond a chip boundary, it is hardly ensured at high clock rates that the data transfer can be performed within on clock period. This must be taken into account in the program design by deliberately reducing the data transfer via such interfaces to one-half the data transfer rate or even less. There are two ways to do this:

1. At least one nop instruction (no operation) is inserted between two successive read statements re which access a port, or
2. on the transmitter side, the handshake port is driven via the write statements wr at half the clock rate at the most.

A further improvement is obtained if the half clock rate on the transmitter and receiver sides is referred to a mean data transfer rate. In that case, a direct succession of write and read statements is permitted for a certain time; however, buffering is effected by additional buffer registers re in the transmitter or receiver buffer f1, f2. The predetermined number of additional buffer registers ri in the transmitter buffer f1 is at least equal to the number of successive write statements wr to the port.

The operation of such two-way data transfer devices is thus ensured independently of the phase or frequency of the two clocks cl1, cl2. If one clock period is not sufficient, particularly if the data transfer takes place beyond chip boundaries, the temporal scope for the data transfer can be arbitrarily extended by the steps described. It is only necessary to provide for sufficient buffering of the data and for a reduced average write and read rate to the respective port.

Such two-way data transfer devices are particularly advantageous in a data-driven array processor containing a plurality of cells which exchange data with their respective neighboring cells or beyond the chip boundary. Such array processors for real-time signal processing, particularly of video signals, require very high clock rates, e.g., up to 125 MHz. The two-way data transfer device in accordance with the invention permits data transfer for a great processing depth, e.g., the execution of a three-address instruction with twelve-bit binary numbers within one clock period, cf. the concurrently filed European patent application (ITT case: U. Schmidt et al 1-2). Since this monolithic integrated array processor works on the MIMD principle (MIMD multiple-instruction, multiple-data-stream), it can be used for a wide variety of tasks. It is thus unpredictable how long individual cells may have to remain in the wait state. Their data sources dq and their data sinks ds are therefore designed as static or quasi-static subcircuits which maintain the respective data state in the event of a cell stop of arbitrary duration. The term "quasi-static subcircuits" as used herein also includes dynamic subcircuits which maintain the respective state for an arbitrary duration via refresh cycles.

Thus, despite the increased circuit complexity, the use of such static or quasi-static subcircuits in the data-exchanging cells z1, z2 is advantageous whenever one cannot predict exactly how long the respective wait state will last.

Figure 5:
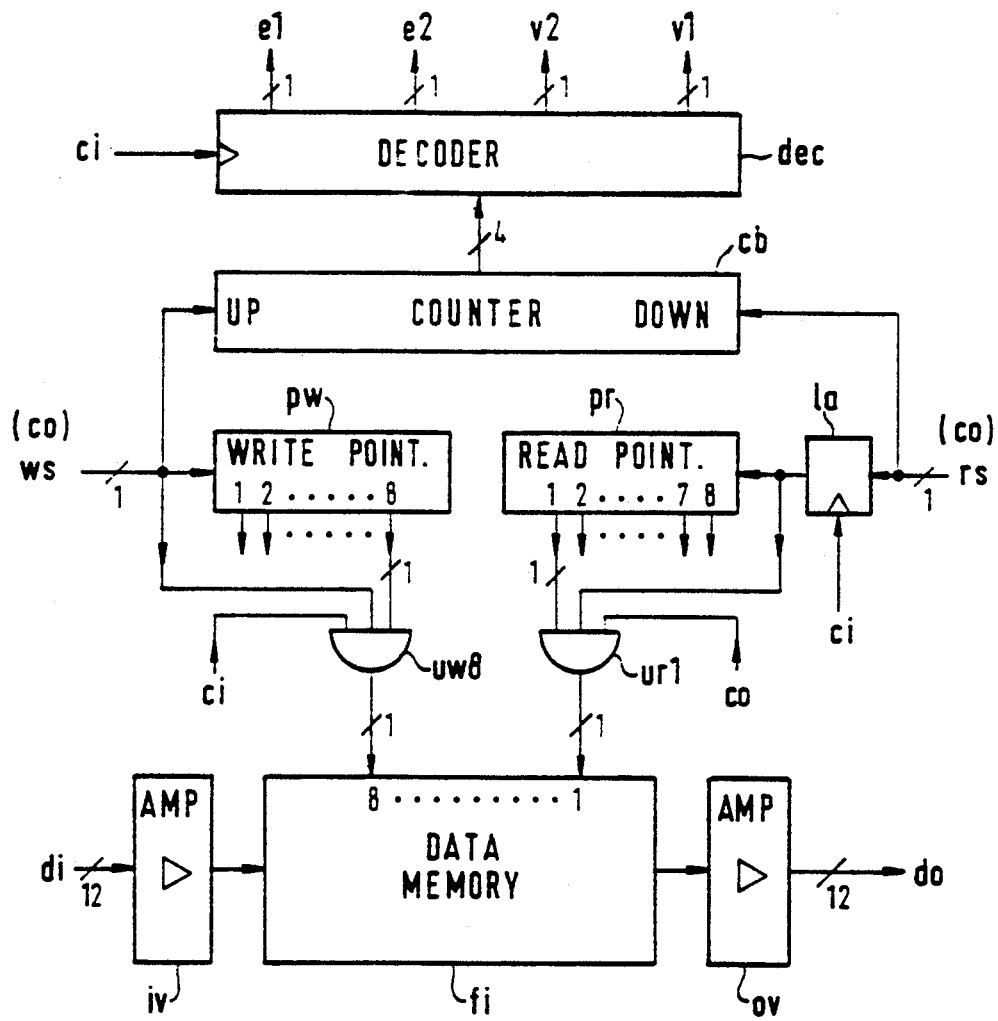
FIG. 5 is a block diagram of an embodiment of a FIFO memory in accordance with the invention.

FIG. 5 shows a block diagram of an embodiment of a FIFO memory used as a buffer according to the invention, which, besides providing the usual status empty signal e, e1 or status full signal v, v1, delivers the second status empty signal e2 or the second status full signal v2. All these status signals relate to the occupancy level of the data memory proper, fi, which can hold eight twelve-bit data words in the example assumed hereinabove. The data to be written, di, is fed in through an input amplifier iv, and the data to be read, do, is fed out through an output amplifier ov.

The operation of the data memory fi is as follows.

A write pointer pw controlled by the write signal ws indicates the write address into which the data word di is to be written. The next write signal ws increments the write address by one position. This continues until the write pointer pw returns to the first address.

Similarly, the read signal rs determines the read address via a read pointer pr. The outputs of the two pointers are in the 1-out-of-8 code and are combined with the write, read, and clock signals by eight AND gates. Of the eight AND gates associated with the write pointer pw and of the eight AND gates associated with the read pointer pr, only the eighth AND read gate uw8 and the first AND write gate ur1 are shown in FIG. 5.

The read signal ws also controls the count-up input auf of a four-bit binary counter cb, whose count-down input ab is clocked by the read signal rs. However, in accordance with the table shown in FIG. 5 at the left, the counter cb is incremented or decremented only if either the read signal rs or only the write signal ws is applied. In all other cases, the count is preserved. As an initial condition, all bits of the counter cb and of the two pointers pw, pr are set to zero.

The four bits of the counter cb are decoded in the decoder dec in accordance with the table shown in FIG. 5 at the right. If the data memory fi is empty, all four bits of the counter cb are "0". In that case, the decoder will set the first and second status empty signals e1, e2. If the data memory fi contains a single data word, the least significant bit of the counter output signal is set. In that case, the decoder dec will set only the second status empty signal e2.

If all registers in the data memory fi are occupied except one, i.e., if seven registers are full, the value of the binary-coded output signal from the counter cd is seven. In that case, the decoder will set only the second status full signal v2. If all eight cells of the data memory fi are full, the count is eight, which causes the decoder dec to set the first and second status full signals v1, v2.

In all other cases, i.e., from count 2 to count 6, the decoder dec will set none of the status signals. It should be noted here that the first status empty signal e1 corresponds to the status empty signal e in FIG. 1, and the first status full signal v1 to the status full signal v.

To prevent any collision between the two pointers pw, pr when the same memory address is written and read simultaneously, the clocking of the read pointer pr is delayed by half a clock period in a latch la. The write and read signals ws, rs are initiated during the co phase of the clock, while the latch releases the read signal rs only half a clock period later during the ci phase. In a similar manner, collision between the 16 AND gates is prevented by linking the eight AND write gates with the ci phase and the eight AND read gates with the co phase.

We claim:

1. A two-way transfer device for interfacing between two data-exchange cell devices, comprising: a first data-exchange cell including a data source; a second data-exchange cell including a data sink;

a transmitter sequential circuit and a receiver sequential circuit for executing a handshaking protocol serving to implement data transfer and for providing a backward cell stop signal and a forward cell stop signal;

a first clock and a second clock for synchronizing data processing in said first cell and in said second cell, respectively;

at least one transmitter buffer associated with said receiver sequential circuit;

said two-way data transfer device being adapted to execute said handshaking protocol within one clock period of said first and said second clocks, said receiver buffer including at least two receiver buffer registers and a first means for providing a first status empty signal and a second status empty signal informing said receiver sequential circuit when all of said receiver buffer registers and all buffer registers but one, respectively, are empty, said first means also providing a first status full signal informing said receiver sequential circuit when all of said receiver buffer registers are full;

said transmitter buffer including two transmitter buffer registers and a second means for setting status full signal and a third status full signal informing said transmitter sequential circuit when all of said transmitter buffer registers and all of said transmitter buffer registers but one, respectively, are full, said second means also being adapted to set a third status empty signal information said transmitter sequential circuit when all of said transmitter buffer registers are empty;

said data sink including means operative to provide a first read statement of a data word from said receiver buffer, and said receiver sequential circuit including means responsive to said second status empty signal, wherein an immediately following second read statement will only be executed ifs aid second status empty signal is not set.

said data sink including means operative to be disabled by said forward cell stop signal, wherein if said third status full signal is set, the execution of said second write statement is delayed by said backward cell stop signal for at least one clock period, and said data source including means operative to provide a first write statement of a data word into said transmitter buffer, and said transmitter sequential circuit including means responsive to said third status full signal, wherein an immediately following second write statement will be executed only if said third status full signal is not set, said data source operative to be disabled by said backward cell stop signal, wherein if said third status full signal is set, the execution of said second write statement is delayed by said backward cell stop signal for at least one clock period, and said data sink and said data source operative such that after a forward or backward cell stop has occurred, the state of said second status empty signal or said third status full signal has no influence on said second read or said second write statement yet to be executed.

2. A two-way data transfer device as defined in claim 1, wherein said receiver buffer and said transmitter buffer include at least a predetermined number of buffer registers for buffing data with different generation and acceptance rates, said generation and acceptance rates within each clock period being determined by said predetermined number of receiver buffer registers and transmitter buffer registers being equal and by said acceptance and said generation rates being equal on the average.

3. The two way data transfer device defined in claim 2, and including data interfaces which exchange data between said two-way data transfer device and other transfer circuits, said two-way data transfer device including means for lengthening data transfer time to at least two clock pulses without altering said handshaking protocol of said two-way data transfer device by said data interfaces providing at least one "no operation" instruction between two successive write statements.

4. The two-way data transfer device defined in claim 2, and including data interfaces which exchange data between said two-way data transfer device and other data transfer circuits, said two-way transfer device including means for lengthening data transfer time to a least two clock pulses without altering the handshake protocol of the system by driving the output of said transmitter at a rate which is half the rate of said first clock and said second clock.

5. The two-way data transfer device define din claim 2, said transmitter buffer including a number of successive write statements wherein said predetermined number of buffer registers in said transmitter buffer is at least equal to said number of successive write statements at the output of the transmitter and that, on average, said output is driven by transmission of said write statements at a rate which is at most half the rate of said first clock and said second clock.

6. The two-way data transfer device defined in claim 1, wherein each said data exchange cell is clocked synchronously.

7. The two-way data transfer device defined in claim 1 including circuit means which maintain the logic states therein in the event of a cell stop of arbitrary duration.

8. The two-way data transfer device defined in claim 1, wherein said first data exchange cell and said second data exchange cell are data interfaces in a data-driven monolithic array processor having a plurality of cells which exchange data with their respective neighboring cells or beyond a chop boundary.

9. The two-way data transfer device defined in claim 2, wherein said transmitter buffer and said receiver buffer include:
a data memory with a plurality addressable registers,
a write pointer controlled by a write signal and a read pointer controlled by a read signal, said write and read pointers being clocked in different phases,
an up/down counter whose count-up and countdown inputs are fed with the write signal and the read signal, respectively, and
a decoder which derives the first and second status empty signals and the first and second status full signals from the count of the up/down counter with the count capacity of the write and read pointers and of the up/down counter being equal to the number "n" of addressable registers of the data memory.

10. The two-way data transfer device defined in claim 1, wherein the number of buffer registers in said transmitter buffer is at least equal to the number of clock periods required to stop said data source or to start said data source for equal lengths of time.

11. The two-way transfer device of claim 9, further including a first and second plurality of AND gates coupled to said data memory, wherein said write signal, said write pointer and said first clock are input to each of said first plurality of AND gates and said read signal, said read pointer and said second clock are input to each of said second plurality of AND gates.

12. The two-way data transfer device of claim 9, further including a latch means for delaying said read signal and said second clock by a half clock period to prevent collision between said read pointer and said write pointer.

13. A method of transferring data between a data source and a data sink including the steps of:
providing a receiver buffer which transmits a first status empty signal, a second status empty signal and a first status full signal to a receiver sequential circuit, said first and second status empty signals indicating when all receiver buffer registers are empty and all but one of said receiver buffer registers are empty, respectively, and said first status full signal indicating when al of said receiver registers are full;
transmitting a first read statement from aid receiver buffer to said data sink;
executing an immediately following second read statement only if said second status empty signal is not set;
disabling said data sink if said status empty signal is set by means of a forward cell stop signal from said receiver sequential circuit; and
delaying execution of said second read statement by at least one clock pulse, said second status empty signal having no influence on said second read statement after said forward cell stop has occurred.

14. The method of claim 13, further including the steps of:
providing a transmitter buffer which transmits a second status full signal, a third status full signal and a third status empty signal to a transmitter sequential circuit, said second and third status full signals indicating when all transmitters buffer registers are full and all but one of said transmitter buffer registers are full, respectively, and said third status empty signal indicating when all of said transmitter registers are empty;
transmitting a first write statement from said data sink to said transmitter buffer;
executing an immediately following write statement only if said third status full signal is not set;
disabling said data source if said third status full signal is set by means of a backward cell stop signal from said transmitter sequential circuit; and
delaying execution of said second write statement by at least one clock pulse.

15. The method of claim 14 whereby said third status full signal has no influence on said second write statement after said backward stop has occurred.

16. The method of claim 14, further including the step of:
providing at least one "no operation " instruction between two successive write statements in order to lengthen data transfer time to at least two clock pulses without altering the handshaking protocol of said method.

17. The method of claim 14, further including the step of driving a handshake port of said data source at half a system clock rate in order to lengthen the data transfer time by at least two clock pulses.

18. The method of claim 13, further including the step of:
clocking a read pointer of said data sink and clocking a write pointer of said data source at different phases so as to prevent collision between said read pointer and said write pointer.

* * * * *